Jan. 17, 1967 E. R. BERGSTRÖM 3,298,107

ARRANGEMENT IN CUTTING BIT HOLDERS

Filed June 8, 1965

INVENTOR.
Ernst Reidar Bergström
BY
Stevens, Davis, Miller & Mosher
Attorneys

United States Patent Office 3,298,107
Patented Jan. 17, 1967

3,298,107

ARRANGEMENT IN CUTTING BIT HOLDERS

Ernst Reidar Bergström, Johanneshov, Sweden, assignor to Stora Kopparbergs Bergslags Aktiebolag, Falun, Sweden, a company of Sweden Filed June 8, 1965, Ser. No. 462,258
Claims priority, application Sweden, June 8, 1964, 6,960/64
8 Claims. (Cl. 33—185)

The present invention relates to an arrangement in cutting bit holders, in particular for end face millers, of the type which are provided with a number of members defining pockets for supporting and positioning the bits therein according to a predetermined position, such as determined by reference surfaces on a positioning matrix.

Positioning of the bits in machine tools of the type wherein a number of loose bits are fixed tolerance-wise in bit holders, often involves both time-wasting and demanding layout requiring well trained and skilled personnel in order to satisfy the close tolerance demands placed on mechanical production within the industry.

In order to avoid these difficulties and to enable a more rapid adjustment of the bits in the tool, pre-shaped plate-like reversible bits have been used, which bits have been made to standard and high tolerance requirements, all corners of said plate-like reversible bits having been ground in a similar and coinciding fashion, so that on installing said bit it is possible to position it so that cutting corner after cutting corner can be utilized until all the corners on the bit are worn down. This method has, in itself, given relatively satisfactory results and facilitated adjustment in pre-arranged pockets which are defined by a stationary supporting surface having abutment shoulders, seats, or the like which conform to the peripheral contour of standard bits. This method, however, demands that the reversible bits as well as the stationary seats or support surfaces be each machined to extremely close tolerances, resulting in large production costs for the tool as well as the bits. Despite this, however, it is difficult to retain pre-determined tolerances and with particularly precise requirements the cutting holders known per se for reversible bits are not suitable. It is therefore an object of the present invention to provide a bit holder for reversible bits wherein the bits can be positioned, firstly individually and secondly as a unit, more accurately than has been possible in reversible bit holders hitherto known.

A further object is to provide such a bit holder which can satisfy close tolerance requirements while using reversible bits which are not accurately machined, such as bits that are unground or only surface ground.

This is achieved by means of the present invention which is substantially characterized in that the support and positioning members for the bits are constituted by sliding members displaceable in relation to each other and to the body of the bit holder, for which sliding members present support surfaces, forming angles with each other thereby defining the pocket boundaries for the bits.

The invention will be further described with reference to an embodiment of the same shown diagrammatically on the attached drawing, wherein:

FIGURE 2 shows diagrammatically one of the pockets in the body of the bit holder according to FIGURE 1, with a standard bit inserted and supported therein, abutting special reference surfaces on the adjusting matrix shown in FIGURE 1.

Figures 1, 3, 4, 9:
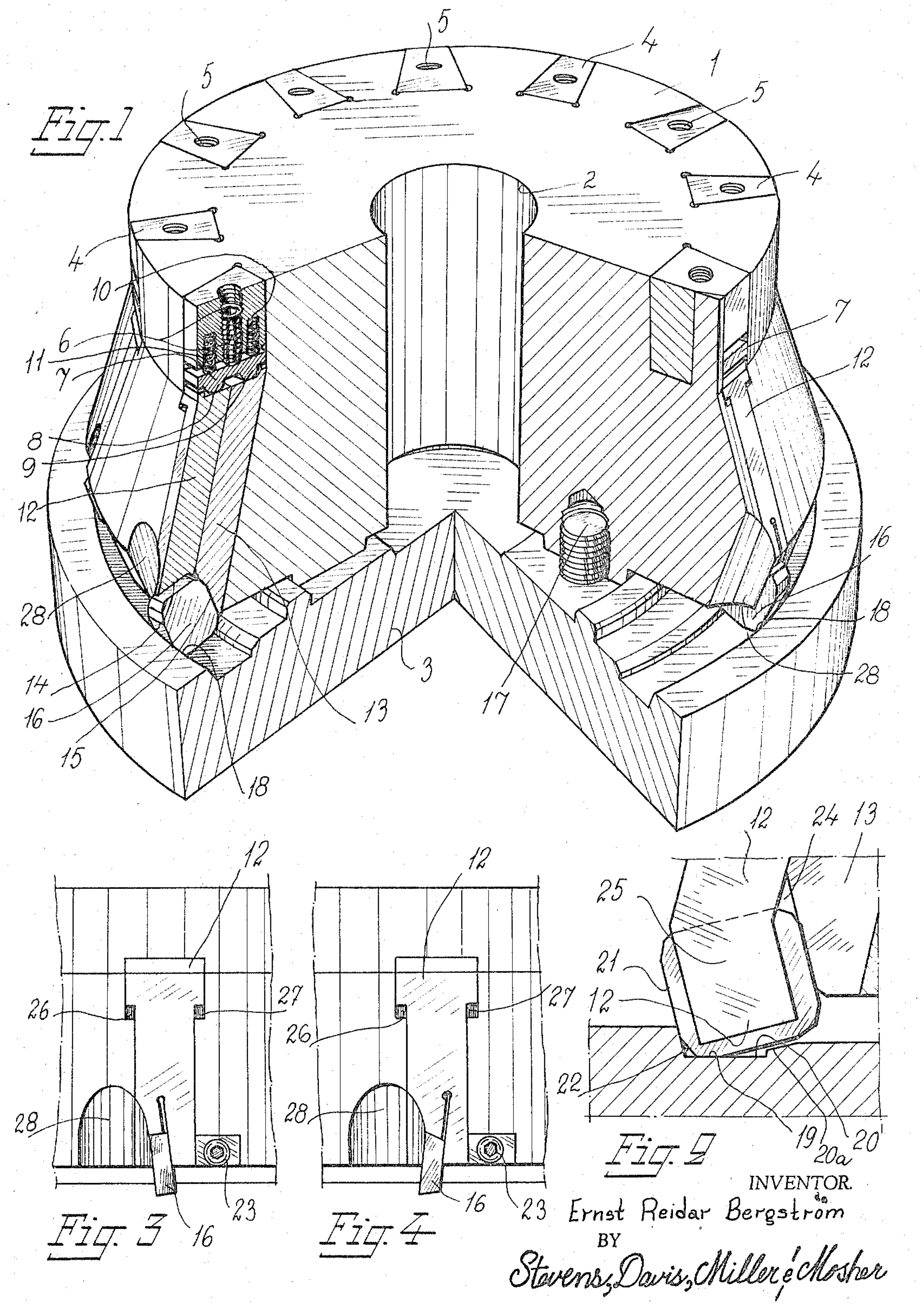
FIGURE 1 shows in perspective partly in section, a bit holder for end face milling, and an associated adjustment matrix for the bits.
FIGURE 3 shows, in a side view, a bit positioned at a negative cutting angle in a special pocket or seating according to the invention.
FIGURE 4 shows the structure of FIGURE 3 but with the bit positioned at a positive cutting angle.

A relatively stationary bit holder body is indicated in the drawing by the reference numeral 1, which body is provided—in the center—with a hole 2 for receiving a mandrel, spindle or the like, not shown, of a milling machine. The bit holder body 1 rests on a circular adjusting matrix 3. A number of trapezoidal blocks 4 are inserted in a flange around the upper periphery of the bit holder body 1, which blocks are fixed, in a suitable way, in position in said body. All of said blocks 4 are pierced by threaded holes 5 which receive screws 6 which can be tightened with the assistance of a suitable tool, such as a socket spanner or the like.

A double armed lever is located under each block 4, which lever 7 is fulcrumed against the lower end of the screw 6 and is provided with two ridges or beads 8 and 9. Further, holes are located in the under surfaces of the blocks which holes receive pressure springs 10 and 11, each acting on a corresponding arm of the double-armed lever 7 at equal distances from the fulcrum point of said lever.

Both beads 8 and 9 are arranged to press against sliding members 12 or 13, respectively, which are in longitudinal edge-to-edge sliding contact and which at least to a certain degree are slidable independently of each other, and which members, in the shown example, slope downwards and outwards in a corresponding inclined section of the holder body. The lower edges or ends of said members 12 and 13 present special support surfaces 14 and 15, respectively, which are thus displaced relative to one another when the sliding members are mutually displaced parallel to each other, but which always form a pre-determined angle, for example a right angle, with each other. These lower surfaces 14 and 15 are intended to form support surfaces, or a seat, for the bits 16.

It is, therefore, seen that blocks 4, screws 6, lever 7, and springs 10 and 11 combine to constitute an adjustment means for regulating the position of the positioning members 12 and 13.

On adjusting the bits in the shown end face miller, the matrix chuck or disc 3 is accurately secured to the undersection of the holder body 1 with the assistance of a number of strong screws 17, the bits being placed in their pockets—partly restricted by surfaces 14, 15—either previous to this securing of disc 3 or approximately at the same time without, however, said bits being fixed in any way. When the matrix 3 has been securely connected to the body 1 in a position determined by reference surfaces on the body and the matrix, the screw 6 is actuated so that the doubled-armed lever 7 is caused to apply pressure, via the beads 9 and 10, against each sliding member 12 and 13 which with their end surfaces adjust the bit 16 so that its corner 18 (seen in FIGURE 2) intended for operation with a plain face 19 abuts a reference surface 20, namely the bottom of a track in the matrix 3, and with a long edge 21 lies against an oblique reference surface 22, i.e. a side surface in said track in the matrix. Surfaces, for example, the surface **20*a*, can thereby be arranged in the matrix for facilitating positioning of the bits. By carefully screwing down the screws 6, all the bits are thereby caused to seek their pre-determined reference surfaces on the matrix, each bit thus being accurately seized between the angular support surfaces 14 and 15 so that they assume a unitary tolerance-retaining adjusting position in relation to the center of the device. It should particularly be pointed out that the double-armed lever 7 automatically adjusts a correct tracking of corresponding surfaces on the bit proper as well as correct tracking by the bit of reference surfaces on the matrix. When the bits have been caused in this way, and with substantially less difficulty than previously, to quickly position themselves, in an automatic manner, in relation to tolerance-retaining reference surfaces prepared beforehand on a matrix member, all bits can be fixed in the usual manner by means of resilient retaining lips known per se which via a wedge are actuated, for example in FIGURES 3 and 4, by eccentric screws 23**.

Further, it should be observed, with reference to FIGURE 2, that both the sliding members 12 and 13 are so shaped at their lower section that they present a type of clearance space 24 which prevents latching of said members and enables a slight free mutual longitudinal sliding movement between said members on seeking, for example, to adjust themselves to the two edge surfaces forming together the angle of the bit. Moreover, it may be mentioned that the one sliding member, in this case the member 12, at its lower section is formed with a stirrup 25 comprising a lateral flange on either side of the surface 14, whereby the bit can be loosely positioned and received. At least one of the flanges of said stirrup is resilient and presses the bit against the other flange of the stirrup, which serves as an abutment for said bit, for the purpose of fixing the bit in its pocket. The sliding members 12 and 13 are suitably associated with members for restricting longitudinal displacement of the same, and as an example it is here shown in FIGURES 3 and 4 how the member 12, at its upper section, is provided with a head operating in a track, the abutment surfaces 26 and 27 of which function as a stop for the downward movement of the sliding member.

It can be further mentioned, that in connection with each bit 16, recesses 28 are located in the holder body for receiving and carrying away chips, cuttings and the like resulting from the working process. These are in the form of milled recesses as is evident from FIGURES 3 and 4 partly in the lower corner sections of the member 12 and continue into the holder body proper.

According to the invention, the sliding members can be inter-changed, particularly the outer member 12, in order to present the above mentioned stirrup members directed with a negative cutting angle or, as is shown in FIGURE 4, with a positive cutting angle. It must also be mentioned that, with the described device, all standard bits, in a manner known per se, can be so rotated that corner after corner is used as long as they work within the tolerance area.

The invention is not restricted to the shown and described embodiment of the same but can be modified in many ways within the scope of the idea of the invention. Thus, the blocks 4 can be replaced by a ring fitted into the holder body said ring being supplied with screw holes intended to receive the screws 6. Further, one single spring can be arranged to load each double-armed lever 7. Finally, only one of the sliding members, the member 12 for example, need be co-ordinated with stop members, attached in the holder body, whereby it can present members in order to limit the relative displacement movement between the sliding members.

What is claimed is:

1. An arrangement for accurately positioning cutting bits in a bit holder for end face millers, comprising: a bit holder body and a matrix member attached to said body, said matrix member comprising a reference surface facing said bit holder, a pair of positioning members mounted within said body and slidably positionable relative to each other and relative to said body, each member in said pair of positioning members including a bit supporting surface, the bit supporting surface of each said positioning member and said matrix reference surface defining the boundaries of a bit receiving pocket, adjustment means to slidably position said positioning members relative to said body and to each other.

2. The arrangement of claim 1, wherein said adjustment means is adapted to slidably position both said positioning members simultaneously.

3. The arrangement of claim 1, wherein one of said positioning members comprises a pair of spaced lateral flanges projecting longitudinally on either side of the corresponding supporting surface, said flanges being adapted to embrace a bit therebetween to hold it against lateral displacement relative to said positioning members.

4. The arrangement of claim 1, wherein said adjustment means comprises a spring means resiliently urging said positioning members towards said matrix reference surface.

5. The arrangement of claim 4, wherein said adjustment means comprises a fulcrumed lever having bearing surfaces which respectively bear against each of said positioning members in said pair of positioning members, said bearing surfaces beng located on opposite sides of the fulcrum point of said lever, said spring means acting against said lever on opposite sides of its fulcrum point and urging said lever simultaneously against both said positioning members.

6. The arrangement of claim 5, wherein said adjustment means comprises a means to displace said lever along the direction in which said positioning members are slidable.

7. The arrangement of claim 5, including a stop means to limit the displacement of said positioning members relative to said body in a direction towards said reference surface.

8. The arrangement of claim 1, wherein said positioning members comprise two generally flat, elongate bars parallelly arranged and in sliding contact along coincident longitudinal edges thereof, corresponding ends of said bars together forming substantially a ninety degree included angle therebetween and constituting said bit supporting surface.

No references cited.

WILLIAM W. DYER, Jr., *Primary Examiner.*

HARRISON HINSON, *Assistant Examiner.*